UNITED STATES PATENT OFFICE.

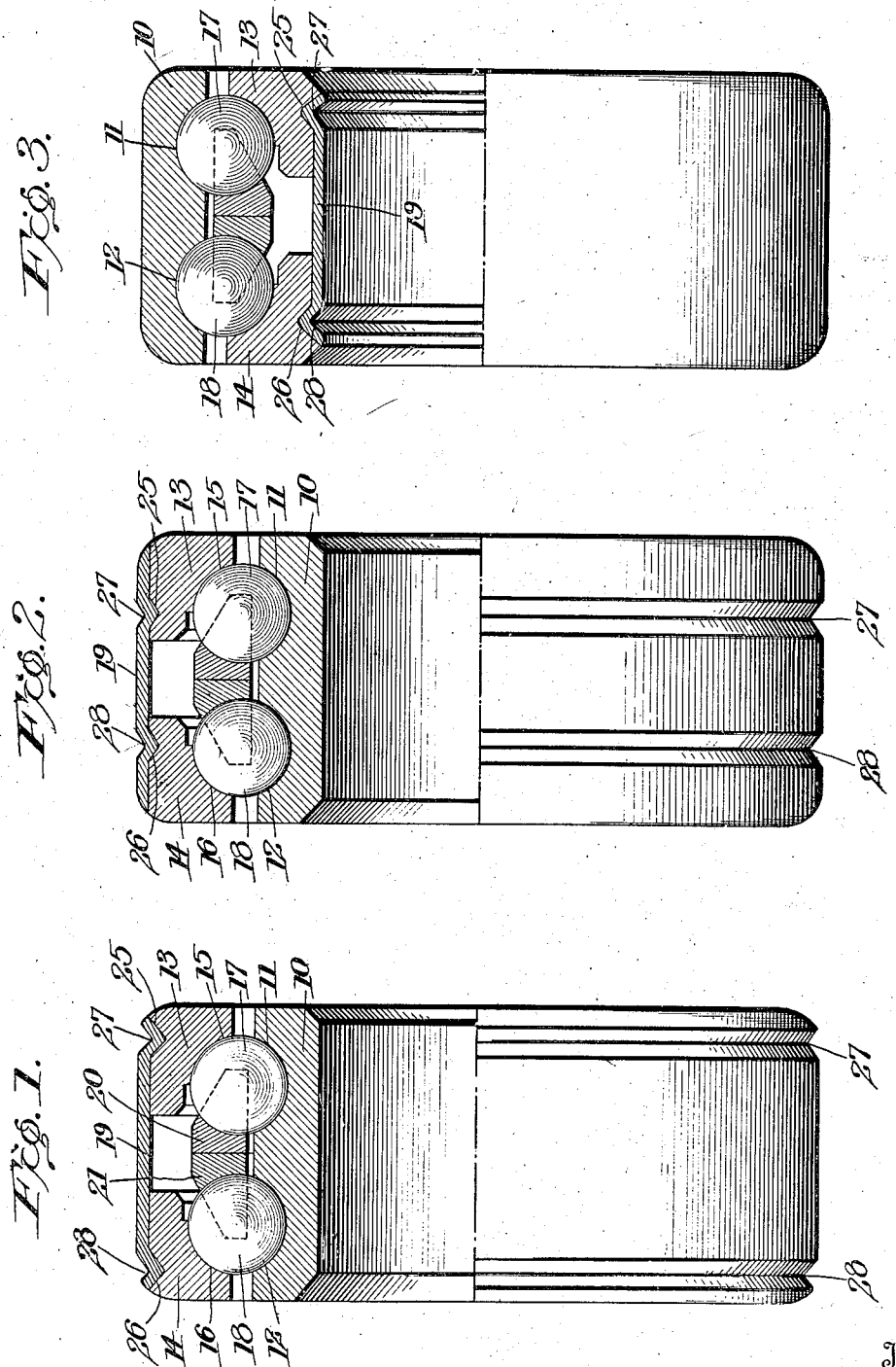

ARTHUR M. LAYCOCK, OF KINGSTON, PENNSYLVANIA, ASSIGNOR TO THE NEW DEPARTURE MANUFACTURING COMPANY, OF BRISTOL, CONNECTICUT, A CORPORATION OF CONNECTICUT.

BEARING.

1,280,620.                   Specification of Letters Patent.        Patented Oct. 1, 1918.

Original application filed September 13, 1916, Serial No. 119,899. Divided and this application filed January 23, 1917. Serial No. 144,000.

*To all whom it may concern:*

Be it known that I, ARTHUR M. LAYCOCK, formerly a subject of the King of Great Britain, but having taken out my first naturalization papers in the United States, residing at Kingston, Luzerne county, State of Pennsylvania, have invented certain new and useful Improvements in Bearings, of which the following is a specification.

My invention relates to antifriction bearings, and more particularly to such bearings embodying a divided race-member, the present being a division of my co-pending application, filed September 13, 1916, which has resulted in Patent No. 1,262,681, issued April 16, 1918, and contains broader claims to the subject-matter here involved.

In bearings having divided race-members it is important that the parts of such race-members be very accurately set with respect to the antifriction members (as the balls) of that particular bearing, and that such race-member-parts be prevented from moving more closely against the balls and thus crowding or "pinching" them, as sometimes tends to occur when the parts of the divided race-member are subjected to heavy lateral pressure, as, for example, when such parts are tightly clamped in some housing in which they are mounted for service. And it is, of course, desirable to hold the parts of the divided race-member from moving away from proper contact with the balls.

The object of my present invention is to provide a simple and easily produced structure in which the parts of the divided race-member can be accurately set and are prevented from having undesired movement. To this end, and also to improve generally upon devices of the character indicated, my invention consists in the various matters hereinafter described and claimed.

In the accompanying drawings, Figure 1 is an elevation partly in section, and Figs. 2 and 3 are similar views showing modifications.

In these drawings, which show the invention embodied in a double-row ball bearing of a well known type, 10 indicates one of the race-members, which is provided with the grooves or races 11 and 12 for the rows of balls 17 and 18, and 13 and 14 indicate the rings which constitute parts of the coöperating, divided race-member, these rings having, respectively, the race portions 15 and 16 against which the antifriction members 17 and 18 bear; 19 represents the casing which holds the rings 13 and 14, and 20 and 21 indicate the separator parts for the respective rows of balls.

As herein illustrated, each ring 13 and 14 is provided with a groove, 25 or 26, in its longitudinal surface, that is, in the surface extending transverse to the side walls of the bearing and being shown as the circumference of the rings in Figs. 1 and 2 and as the inner surface of such rings in Fig. 3. These grooves extend transverse to the longitudinal axis of such surfaces (as about the circumference of the rings in Figs. 1 and 2) and are preferably flaring and symmetrical, as V-shaped. The casing 19, of bendable material, has portions, 27 and 28, bent into beads which enter these grooves and engage the opposite faces of each. Each of these beads can be formed by a simple spinning operation, and the production of a single bead simultaneously produces shoulders which engage the opposite faces of the ring-groove in which it lies, so that the single bead securely holds its race-ring against displacement in either direction along the casing, the casing thus becoming a stop-member for the rings 13 and 14. The flaring shape of the grooves not only permits the beads 27 and 28 to be readily spun into them but also enables the beads and the groove-walls to bear against each other over surfaces of considerable area. Manifestly, the beads can be produced at any desired part of the bendable casing, so that the rings 13 and 14 of a bearing can be brought to and secured in just the proper contact with the balls required for that particular bearing, and after the beads are formed the parts of the divided race-member are thereby securely locked against displacement either toward or away from the balls, a single bead holding its race-ring against movement in both such directions. Thus, in a bearing constructed in accordance with my present invention, the parts of the divided race-member can be set with greatest nicety with respect to the balls, and when they are so set a single bead holds each such race-member-part securely against displacement either toward or away from its coöperating balls.

In Figs. 1 and 2 the outer race-member is shown as the divided one, while in Fig. 3 the inner race-member is so shown. In Figs. 1 and 3 the beads and grooves are shown near the outer edges of the race-rings, while in Fig. 2 they are shown nearer the inner edges thereof.

I claim:

1. In an antifriction bearing, antifriction members, a divided race-member whose parts coöperate with said antifriction members, one of said race-member-parts having in its longitudinal surface a groove which extends transverse to the longitudinal axis of said surface, and a bendable stop-member having a portion bent into said groove, there being means for holding said stop-member against movement with respect to the other of said race-member parts; substantially as described.

2. In an antifriction bearing, antifriction members, a divided race-member whose parts coöperate therewith, each of said race-member-parts having in its longitudinal surface a groove which extends transverse to the longitudinal axis of said surface, and a bendable stop-member having portions bent into said grooves; substantially as described.

3. In an antifriction bearing, antifriction members, a divided race-member whose parts coöperate with said antifriction members, one of said race-member-parts having in its longitudinal surface a flaring groove which extends transverse to the longitudinal axis of said surface, and a bendable stop-member having a portion bent into said groove against the flaring walls thereof, there being means for holding said stop-member against movement with respect to the other of said race-member-parts; substantially as described.

In testimony whereof I affix my signature in presence of two witnesses.

ARTHUR M. LAYCOCK.

Witnesses:
C. W. WIRTH,
THOS. H. DAY.